UNITED STATES PATENT OFFICE.

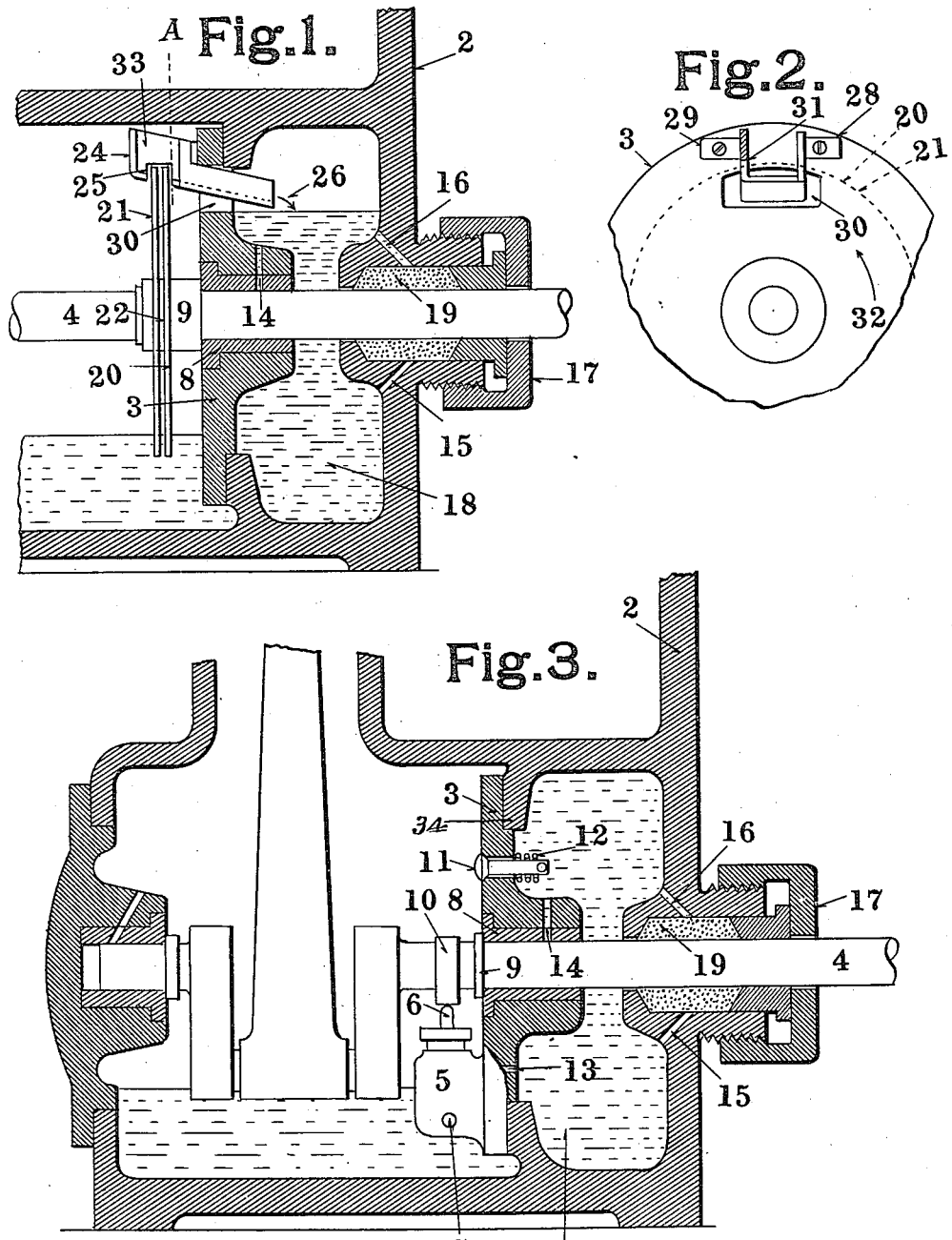

VALÈRE A. FYNN, OF ST. LOUIS, MISSOURI, ASSIGNOR TO WESTERN ELECTRIC MANUFACTURING COMPANY, OF ST. LOUIS, MISSOURI, A CORPORATION OF MISSOURI.

OIL-SEAL FOR BEARINGS.

1,375,376.          Specification of Letters Patent.      Patented Apr. 19, 1921.

Application filed January 30, 1920. Serial No. 355,051.

*To all whom it may concern:*

Be it known that I, VALÈRE A. FYNN, a subject of the King of England, residing at the city of St. Louis, State of Missouri, United States of America, have invented a certain new and useful Oil-Seal for Bearings, of which the following is such a full, clear, and exact description as will enable any one skilled in the art to which it appertains to make and use the same, reference being had to the accompanying drawings, forming part of this specification.

My device is designed with a view to preventing the escape of gases from the crank chamber of compressors, internal combustion engines and the like. It is particularly designed with a view to preventing the escape of ammonia or other refrigerant gases from the crank chamber of a refrigerant compressor. Another object of the arrangement is to secure thorough lubrication of the main crank shaft bearing and of the packing in the stuffing box between the shaft and a wall of the crank case.

In carrying out my invention, I provide means whereby there will be created a difference of pressure between the two ends of the joint along which an escape of gas pressure or fluid is to be feared, and I so arrange matters that this pressure will oppose any gases or liquids tending to flow along that joint and out of the crank case. The joint I have in mind is, for instance, that between the crank shaft and the journal of the bearing in question, and the purpose of my device is to create at the outer end of said journal a pressure in excess of that which exists at the inner or crank case end of same.

In one embodiment of my invention, I provide an oil chamber about the crank shaft and between the main crank shaft bearing and a stuffing box and provide means for holding the oil level in said chamber well above the crank shaft and above the oil level in the crank case.

When it is desired to provide a difference of pressure in excess of that which can be obtained by simply raising the level in the auxiliary oil chamber above the crank shaft and above the oil level in the crank case, then I may obtain this greater pressure by means of a pump which may be operated by the crank shaft to force oil (or air) into the auxiliary crank chamber. Under these circumtsances, I prefer to provide the auxiliary crank chamber with a relief valve, thus limiting the maximum pressure which can be produced in said chamber.

My invention will be better understood by reference to the accompanying drawings, in which Figure 1 is a vertical section illustrating one embodiment thereof, Fig. 2 is a section taken on the line A of Fig. 1, and Fig. 3 is a modification.

Referring more particularly to Figs. 1 and 2, the crank chamber is formed in the casting 2 and that end of it which accommodates the stuffing box 17 is divided off by means of the circular plate 3 to form an oil chamber 18 between the stuffing box and the main bearing bushing 8 carried by the plate 3. This plate has an opening 30 located well above the crank shaft 4. Any oil poured into the chamber 18 will not rise beyond the indicated level because of this opening 30. Channels 15, 16 give this oil free access to the packing 19 of the gland 17, and keep this packing moist and therefore efficient. The channel 14 gives the oil in chamber 18 access to the main crank shaft bearing. As long as the stuffing box is in first class condition, and the crank shaft has a minimum of play in the main bearing, it will take a considerable time for the oil level in chamber 18 to fall below the crank shaft 4, but oil from that chamber will be escaping all the time, and it is necessary to keep replenishing the supply. To this end, a couple of disks 20, 21 are mounted on the crank shaft and arranged to dip into the oil in the crank case, even when the latter is at its lowest permissible level. These disks may have serrated edges in order to carry more oil as they revolve, and are preferably so spaced, by means of the washer 22, that the two of them will carry more than twice the amount of oil which any one of them could carry if operated by itself. A trough 24 is attached to the plate 3 and so placed as to coöperate with the top of the two oil carrying disks 20, 21. Chamber 33 is formed in that trough and one side of it is cut away so as to allow free approach of the disks and of any oil which they may carry, while the other side is provided with a slot 25 which is just large enough to allow the disks to go by without touching its sides.

The bottom, or floor of the trough is slightly inclined toward the oil chamber 18, and this trough reaches into said chamber through the opening 30.

In operation, the oil in the crank case is brought to a suitable level and the auxiliary oil chamber 18 is filled to overflow through some convenient opening (not shown). As soon as the crank shaft is set in motion, the disks 20 and 21 dipping into the crank case oil will begin to carry a considerable amount of the lubricant near their peripheries. This oil will be carried by these disks into the chamber 33 of the trough 24, but will be scraped off these disks by the edges of the slot 25 and particularly by its upper edge 31. In this way, the chamber 33 will be kept full of oil, some of which at least will run down the trough into the oil chamber 18, as indicated by the arrow 26. It is a very simple matter to form the oil carrying means 20, 21 and the trough 24 so as to supply to the oil chamber 18 far more oil than can possibly find its way out of this chamber by other means than the opening 30 in the plate 3. No matter what the gas pressure in the crank case may be, the pressure in the joint between the shaft 4 and the bushing 8 will be the same as the pressure in the crank chamber, plus the pressure due to the column of oil in the chamber 18 above that joint. No gas in the crank chamber can, under these conditions, escape into the atmosphere through the main bearing or the stuffing box. The greater pressure in the auxiliary chamber end of the bushing 8 will prevent gas from traveling along that joint in that direction, but even if it did, it would merely reach the oil in the chamber 18, would mix with same, and be absorbed by it. Any gas entering the chamber 18 through the opening 30 would have to reach down through the oil in order to get at the stuffing box, and even if it did reach same, it would have great difficulty in passing through it because of the constantly moist state of the packing 19. Because this packing 19 is kept in such good condition by the arrangement shown, it is possible to reduce the length of the stuffing box, and also work the packing 19 under a smaller pressure than would otherwise be required. In this manner I secure thorough lubrication and prevent the escape of gases from the crank case without employing an objectionably high oil level in said crank case.

Referring to Fig. 3, a closed oil chamber 18 is formed at that end of the crank case at which the stuffing box 17 is located. Centered on a suitable flange 34, cast integral with the crank case housing 2, is a plate 3 carrying the bushing 8 for the main crank shaft bearing. This plate also carries a small pump 5 of any desired construction, the intake opening 7 of which is located below the oil level in the crank case and which discharges the oil it pumps into the chamber 18, for instance, by means of the opening 13. The plunger 6 of this pump is actuated by an eccentric 10 on the crank shaft 4. Located in the plate 3 is a valve 11 controlled by the spring 12. This valve opens into the crank case. The oil in the oil chamber 18 has free access to the main crank shaft bearing through the opening 14 and to the packing 19 of the gland 17 through the openings 15, 16.

The crank shaft 4 may, or may not have a collar 9 adapted to coöperate with the bushing 8. In this way, it is possible to prevent the escape of gases from the crank chamber along the crank shaft without employing an objectionably high oil pressure in the crank case. At the same time, the packing in the stuffing box is kept in its most effective condition and ample lubrication is provided for the main crank shaft bearing. The valve 11 may be set for any desired pressure in excess of the crank case pressure.

Having fully described my invention what I claim as new and desire to secure by Letters Patent of the United States is:

1. The combination with a shaft, of a stuffing box for said shaft, a bearing for said shaft situated adjacent to said stuffing box with an auxiliary oil chamber therebetween, a main oil reservoir, and means for maintaining the pressure in said auxiliary chamber above that in said main reservoir.

2. The combination with a shaft, of a stuffing box for said shaft, a bearing for said shaft situated adjacent to said stuffing box with an auxiliary chamber therebetween, a main oil reservoir, and means for maintaining the oil level in said auxiliary chamber above that in said main reservoir.

3. The combination with a shaft, of a stuffing box for said shaft, a bearing for said shaft situated adjacent to said stuffing box with an auxiliary oil chamber therebetween, oil ducts leading from said auxiliary chamber to said stuffing box and bearing, a main oil reservoir, and means for maintaining the pressure in said auxiliary chamber above that in said main reservoir.

4. The combination with a shaft, of a stuffing box for said shaft, a bearing for said shaft situated adjacent to said stuffing box with an auxiliary oil chamber therebetween, a main reservoir for supplying oil to said auxiliary chamber, and means operative from said shaft for maintaining the pressure in said auxiliary chamber above that in said main reservoir.

5. The combination with a shaft, of a stuffing box for said shaft, a bearing for said shaft adjacent to said stuffing box with an auxiliary oil chamber therebetween, a main reservoir for supplying oil to said auxiliary chamber, and means operative from said shaft for conveying oil from said reservoir to said auxiliary chamber.

6. The combination with a shaft, of a stuffing box for said shaft, a bearing for said shaft situated adjacent to said stuffing box with an auxiliary oil chamber therebetween, a main reservoir, and a disk carried by said shaft for conveying the oil from said main reservoir to said auxiliary oil chamber.

7. The combination with a shaft, of a stuffing box for said shaft, a bearing for said shaft situated adjacent to said stuffing box with an auxiliary oil chamber therebetween, a main oil reservoir for supplying oil to said auxiliary chamber, a disk carried by said shaft and having its lower part submerged in the oil in said main reservoir, and means for removing the oil from the upper part of said disk and supplying it to said auxiliary oil chamber.

8. The combination with a shaft, of a stuffing box for said shaft, a bearing for said shaft situated adjacent to said stuffing box with an auxiliary oil chamber therebetween, a main oil reservoir for supplying oil to said auxiliary chamber, a plurality of disks carried by said shaft and having their lower part submerged in the oil in said main reservoir, and means for removing the oil from the upper part of said disks and supplying it to said auxiliary oil chamber.

9. The combination with a crank case of a compressor or the like provided with an oil reservoir, of a crank shaft, a stuffing box for said crank shaft carried by said case, a partition in said case carrying one of the main bearings for the crank shaft and forming an auxiliary oil chamber, and means for maintaining the pressure in the auxiliary oil chamber above that in said reservoir.

10. The combination with the crank case of a compressor or the like, of a crank shaft, a stuffing box for said crank shaft carried by said case, a partition in said case carrying one of the main bearings for said crank shaft and forming an auxiliary oil chamber at the side of said bearing adjacent to said stuffing box and a main oil reservoir at the opposite side of said bearing, and means for maintaining the pressure in the auxiliary oil chamber above that in said main reservoir.

In testimony whereof, I have hereunto set my hand and affixed my seal.

VALÈRE A. FYNN. [L. S.]